United States Patent [19]
McCarville

[11] Patent Number: 6,039,832
[45] Date of Patent: Mar. 21, 2000

[54] THERMOPLASTIC TITANIUM HONEYCOMB PANEL

[75] Inventor: Douglas A. McCarville, Auburn, Wash.

[73] Assignee: The Boeing Company, Seattle, Wash.

[21] Appl. No.: 09/032,227

[22] Filed: Feb. 27, 1998

[51] Int. Cl.[7] .............................. B32B 31/04; B32B 31/12
[52] U.S. Cl. ......................................... 156/292; 156/309.6
[58] Field of Search .................................... 428/116, 118; 156/292, 308.2, 308.6, 309.6, 324.4

[56] References Cited

U.S. PATENT DOCUMENTS

| | | |
|---|---|---|
| 3,758,234 | 9/1973 | Goodwin . |
| 3,888,661 | 6/1975 | Levitt et al. . |
| 3,936,277 | 2/1976 | Jakway et al. . |
| 3,939,024 | 2/1976 | Hoggatt . |
| 3,959,091 | 5/1976 | Moji et al. . |
| 3,989,876 | 11/1976 | Moji et al. . |
| 3,991,928 | 11/1976 | Friedrich et al. . |
| 4,010,884 | 3/1977 | Rothman . |
| 4,115,611 | 9/1978 | Stoltze et al. . |
| 4,132,828 | 1/1979 | Nakamura et al. . |
| 4,137,370 | 1/1979 | Fujishiro et al. . |
| 4,141,802 | 2/1979 | Duparque et al. . |
| 4,249,974 | 2/1981 | Wilson ................................. 156/309.6 |
| 4,356,678 | 11/1982 | Andrews et al. . |
| 4,411,380 | 10/1983 | McWithey et al. . |
| 4,473,446 | 9/1984 | Locke et al. . |
| 4,489,123 | 12/1984 | Schijve et al. . |

(List continued on next page.)

FOREIGN PATENT DOCUMENTS

| | | |
|---|---|---|
| 307 215 B1 | 3/1989 | European Pat. Off. . |
| 463 611 A2 | 1/1992 | European Pat. Off. . |

OTHER PUBLICATIONS

FIBERITE® Data Sheet 5: "Fabricating with Aromatic Polymer Composite, APC–2," 1986.

Smith, B.A., et al., "Airframers Pursue Lower Aircraft Costs," *Aviation Week & Space Technology*, Sep. 5, 1994, p. 57.

Lawcock, G., et al., "Novel Fiber Reinforced Metal Laminates for Aerospace Applications—A Review," *SAMPE Journal*, vol. 31, No. 1, Jan./Feb. 1995, pp. 23–31.

Velicki, A., "Materials and Structures for the HCST," *Aerospace Engineering*, Apr. 1995, pp. 17–19.

Johnson, W.S., et al., "High Temperature Hybrid Titanium Composite Laminates: An Early Analytical Assessment," Tenth International Conference on Composite Materials, ICCM–10, Whistler, B.C., Canada, Aug. 14–18, 1995, 10 pages.

*Primary Examiner*—Michael W. Ball
*Assistant Examiner*—Barbara Musser
*Attorney, Agent, or Firm*—Christensen, O'Connor, Johnson & Kindness pllc

[57] ABSTRACT

The present invention discloses a structural panel sequentially comprising a first face sheet having an outward facing thermoplastic surface and an inward facing bonding surface, a first thermoplastic bonding layer, a titanium honeycomb core, a second thermoplastic bonding layer, and a second face sheet having an outward facing thermoplastic surface and an inward facing bonding surface. The face sheet is formed by thermally consolidating a thermoplastic laminate composite and a bonding layer. The face sheet bonding surface and intermediate bonding layer are made from thermoplastic resinous materials having comparable melt temperatures that are lower than that of the thermoplastic materials of the laminate composite. The present invention also provides a method for fabricating a structural panel having thermoplastic face sheets and a titanium honeycomb core that includes the steps of forming a first and second thermoplastic face sheet; preparing a titanium honeycomb core for bonding to the face sheets; and thermally consolidating a panel assembly sequentially having a first face sheet having an outward facing thermoplastic surface and an inward facing bonding surface, a first thermoplastic bonding layer, a titanium honeycomb core prepared for bonding to the face sheets, a second thermoplastic bonding layer, and a second face sheet having an outward facing thermoplastic surface and an inward facing bonding surface.

29 Claims, 7 Drawing Sheets

U.S. PATENT DOCUMENTS

| | | |
|---|---|---|
| 4,500,589 | 2/1985 | Schijve et al. . |
| 4,624,897 | 11/1986 | Ito . |
| 4,714,509 | 12/1987 | Gruber . |
| 4,715,923 | 12/1987 | Knoll . |
| 4,716,067 | 12/1987 | Moji et al. ............................ 428/116 |
| 4,753,850 | 6/1988 | Ibe et al. . |
| 4,775,602 | 10/1988 | Rasch . |
| 4,777,098 | 10/1988 | Takamura et al. . |
| 4,790,898 | 12/1988 | Woods . |
| 4,816,347 | 3/1989 | Rosenthal et al. . |
| 4,859,267 | 8/1989 | Knoll . |
| 4,894,105 | 1/1990 | Dyksterhouse et al. . |
| 4,917,968 | 4/1990 | Tuffias et al. . |
| 4,919,739 | 4/1990 | Dyksterhouse et al. . |
| 4,935,291 | 6/1990 | Gunnink . |
| 4,943,472 | 7/1990 | Dyksterhouse et al. . |
| 4,956,026 | 9/1990 | Bell . |
| 4,992,323 | 2/1991 | Vogelesang et al. . |
| 5,006,419 | 4/1991 | Grunke et al. . |
| 5,008,157 | 4/1991 | Paxos . |
| 5,009,966 | 4/1991 | Garg et al. . |
| 5,030,488 | 7/1991 | Sobolev . |
| 5,039,571 | 8/1991 | Vogelesang et al. . |
| 5,039,572 | 8/1991 | Vogelesang et al. . |
| 5,076,875 | 12/1991 | Padden . |
| 5,079,101 | 1/1992 | Murayama . |
| 5,087,500 | 2/1992 | Kasper et al. ............................ 428/116 |
| 5,100,737 | 3/1992 | Colombier et al. . |
| 5,104,460 | 4/1992 | Smith, Jr. et al. . |
| 5,122,422 | 6/1992 | Rodhammer et al. . |
| 5,128,198 | 7/1992 | Dysterhouse et al. . |
| 5,143,276 | 9/1992 | Mansbridge et al. . |
| 5,160,561 | 11/1992 | Gruber . |
| 5,160,568 | 11/1992 | Gruber . |
| 5,160,771 | 11/1992 | Lambing et al. . |
| 5,181,647 | 1/1993 | Runyan . |
| 5,200,004 | 4/1993 | Verhoeven et al. . |
| 5,213,904 | 5/1993 | Banker . |
| 5,215,832 | 6/1993 | Hughes et al. . |
| 5,232,525 | 8/1993 | Smith et al. . |
| 5,242,759 | 9/1993 | Hall . |
| 5,260,137 | 11/1993 | Rosenthal et al. . |
| 5,403,411 | 4/1995 | Smith et al. . |
| 5,429,326 | 7/1995 | Garesché et al. . |
| 5,429,877 | 7/1995 | Eylon . |
| 5,460,774 | 10/1995 | Bachelet . |
| 5,460,865 | 10/1995 | Tsotsis ...................................... 428/116 |
| 5,578,384 | 11/1996 | Kingston . |
| 5,599,993 | 2/1997 | Hergenrother et al. ................. 564/328 |
| 5,609,288 | 3/1997 | Johnson .................................. 228/157 |
| 5,667,867 | 9/1997 | Meier et al. ............................ 428/116 |
| 5,866,272 | 2/1999 | Westre et al. ........................... 428/118 |

THERMOPLASTIC TITANIUM HONEYCOMB PANEL

FIELD OF THE INVENTION

The present invention relates generally to a structural panel and, more particularly, to a titanium honeycomb panel having thermoplastic face sheets.

BACKGROUND OF THE INVENTION

Thermoplastic composites have excellent strength to weight and elevated use temperature capabilities. The combination of a tough thermoplastic composite face sheet useful in the temperature range between 350° and 400° F., and a stiff environmentally durable titanium honeycomb make thermoplastic coated titanium core panel composites attractive as low-weight and reduced life cycle cost design options. These composites find use in aircraft and space vehicles as high-temperature face sheets on large primary structure panels including, for example, weapons bay doors, avionics doors, cryogenic tanks, and nacelle acoustic panels.

Figure 1A:
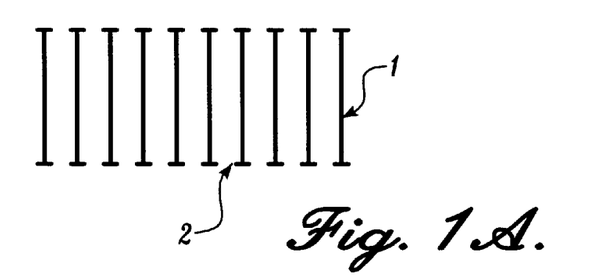
FIG. 1A is a side view of a flanged honeycomb core.
Figure 1B:
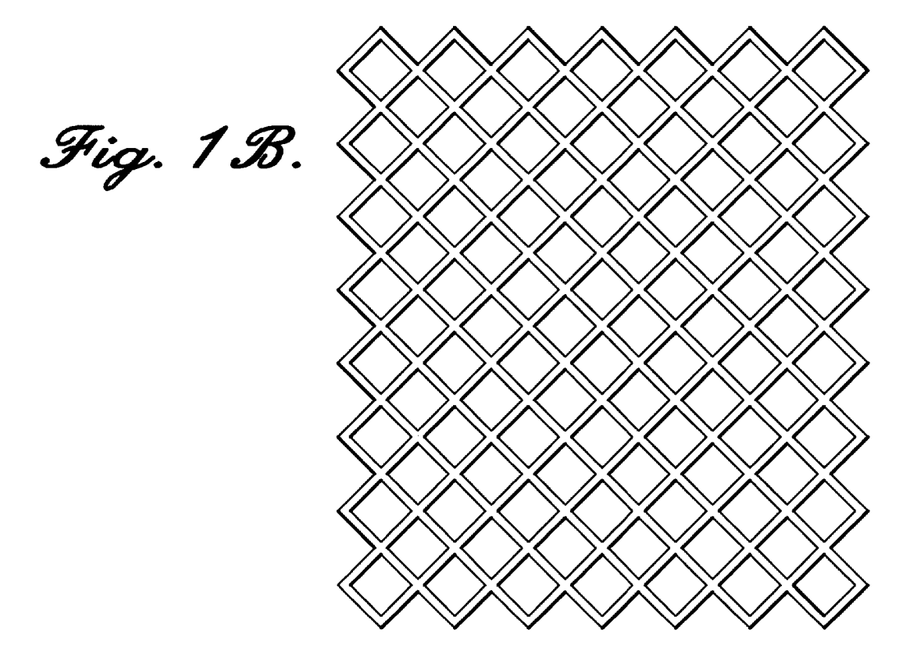
FIG. 1B is a top view of a flanged honeycomb core.
Figure 2A:
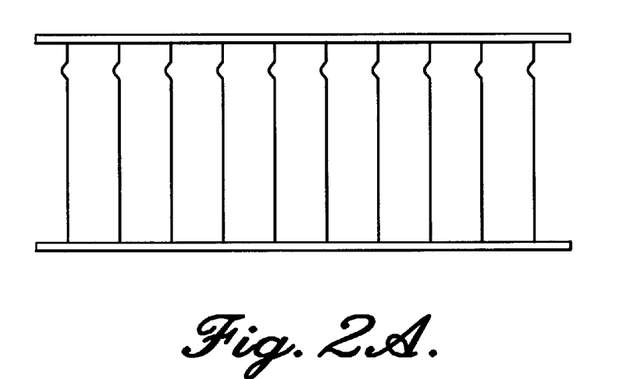
FIG. 2A is a side view of a honeycomb panel having a crushed honeycomb core.
Figure 2B:
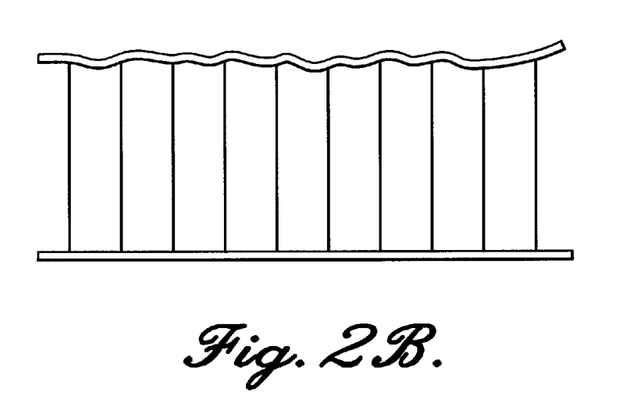
FIG. 2B is a side view of a honeycomb panel having a dimpled face sheet.
Figure 2C:
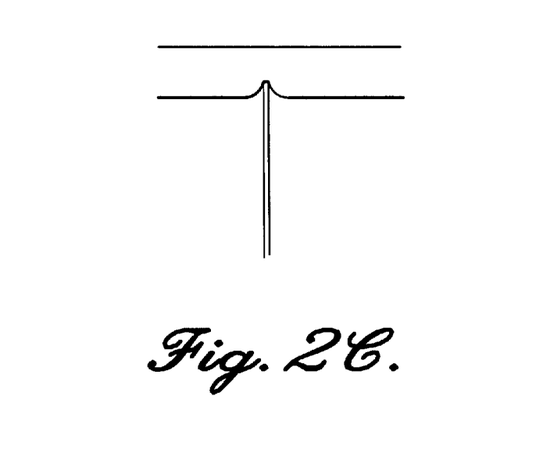
FIG. 2C is a side view of a honeycomb panel exhibiting face sheet ply cutting.

However, attempts to form thermoplastic coated titanium honeycomb panels has proved unsuccessful especially for weight critical applications where low density (e.g., less than 6 lb/ft$^3$), large cell (e.g., ¼–⅜ inch), thin foil (e.g., 2.0–2.5 mil) cores are desired. Successful consolidation (e.g., at thermoplastic curing conditions of 665° F. and 185 psi) of certain thermoplastic face sheets to medium density (6 lb/ft$^3$ and 3/16 cell size) polyimide cores has been accomplished and has been determined to be structurally valid through flatwise tensile, core shear, plate shear, and impact testing. Attempts to co-consolidate thermoplastic panels with titanium honeycomb cores have proved unsuccessful except when using extremely weight inefficient flanged cores. FIG. 1A is a cross-sectional view of a flanged core having cell walls 1 capped with flanges 2. FIG. 1B is a top view of a flanged honeycomb core. Deficiencies that render the use of nonflanged titanium cores ineffective when consolidating thermoplastics at high temperatures and pressures include core crushing, face sheet dimpling, and face sheet ply cutting as illustrated in FIGS. 2A–C, respectively.

As an alternative to panel fabrication by co-consolidation, attempts to fabricate thermoplastic titanium panels have involved preconsolidating the thermoplastic face sheets and then secondarily bonding the consolidated face sheets to the titanium core using a low temperature/pressure (e.g., 350° F. and 45 psi) curing adhesive. A significant drawback to a panel fabricated by this method is that the elevated use temperature (e.g., 350–400° F.) capabilities of such thermoplastic face sheets limits the fabricated panel's environmental regime to that of low temperature bonding adhesive (e.g., about 250° F.).

Accordingly, there exists a need for a thermoplastic titanium honeycomb panel structure that offers the high temperature advantages associated with thermoplastic face sheets and the structural durability of titanium honeycomb. A need also exists for methods for preparing thermoplastic titanium honeycomb panels. The present invention seeks to fulfill these needs and provides further related advantages.

SUMMARY OF THE INVENTION

In one aspect, the present invention provides a structural panel having a titanium honeycomb core and thermoplastic face sheets. The thermoplastic face sheets of the structural panel are bonded to the titanium honeycomb core through intermediate thermoplastic bonding layers. The face sheet has an outward facing thermoplastic surface that is stable to elevated temperature and an inward facing bonding surface. The face sheet is formed by thermally consolidating a laminate composite having one or more plies of a first thermoplastic resinous material and a bonding layer made of a second thermoplastic material. The melt temperature of the first thermoplastic material is higher than that of the second thermoplastic material. The melt temperature of the thermoplastic materials of the bonding layer intermediate the facing sheet and titanium honeycomb core is comparable to the second thermoplastic material and lower than that of the first. In a preferred embodiment, the titanium honeycomb core includes resinous fillets that increase the bonding surface of the core and facilitate the formation of a strong bond between the core and the face sheet during a co-consolidation cycle. Because the face sheet is preconsolidated at an elevated temperature to incorporate a bonding surface, and because in a preferred embodiment the titanium core includes resin fillets, the co-consolidation cycle to create the final panel need only reach a temperature sufficient to bond the face sheet bonding surface to the core resinous fillets through the bonding layer, all of which are composed of a thermoplastic resinous material having a melt temperature lower than the thermoplastic face sheets.

In another aspect, the present invention provides a method for fabricating a thermoplastic titanium honeycomb panel. The method is a thermal consolidation method that includes fabricating the thermoplastic face sheets, preparing the titanium honeycomb core for bonding, and forming the honeycomb panel by co-consolidation of the thermoplastic face sheets to the titanium core through intermediate thermoplastic resinous bonding layers. By virtue of the relatively low temperature required for the co-consolidation process, no face sheet delamination, degradation, or other damage to the individual components of the panel occurs.

The thermoplastic titanium honeycomb panel of the present invention provides a combination of a tough thermoplastic composite face sheet useful in the temperature range between 350° and 400° F. and a stiff, environmentally durable titanium honeycomb core for high load carrying environments. Thus, the structural panels formed in accordance with the present invention are suitable for primary structural members in aircraft and spacecraft.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

The present invention provides a structural panel having a titanium honeycomb core and high temperature thermoplastic facing sheets. The thermoplastic titanium honeycomb cores formed in accordance with the present invention can operate at elevated temperature and in high load-carrying environments as required for primary structural members in aircraft and spacecraft. The present invention also provides a method for fabricating a thermoplastic titanium honeycomb panel. The method of the present invention provides a structural panel having thermoplastic composite face sheets stable at elevated temperatures that are co-consolidated with a stiff, environmentally durable titanium honeycomb core. As used herein, the term "co-consolidation" refers to a process for bonding the panel's thermoplastic face sheets to the titanium honeycomb core through intermediate thermoplastic bonding layers.

Figure 3:
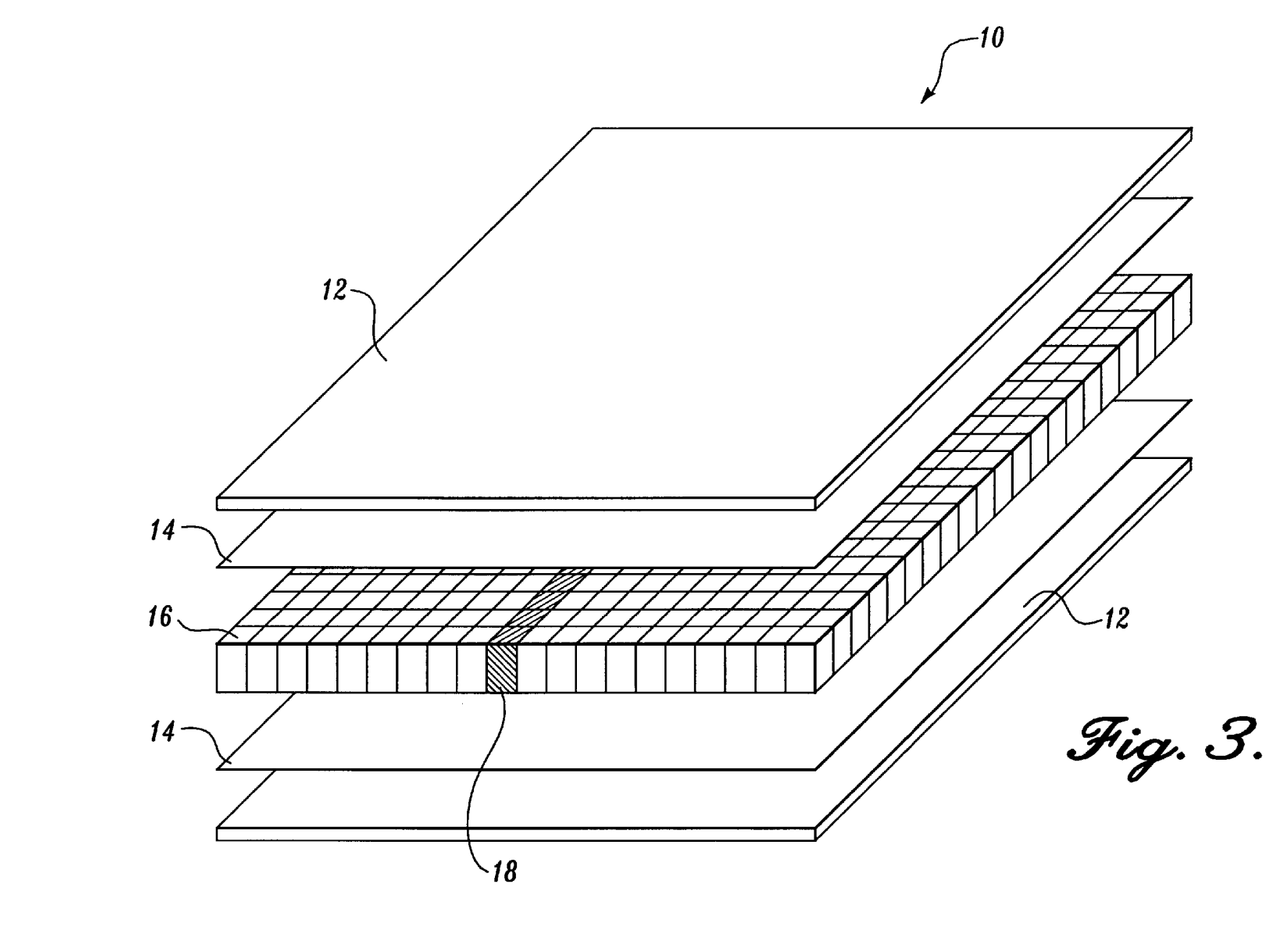
FIG. 3 is an exploded perspective view of a honeycomb panel formed in accordance with the present invention.

A representative thermoplastic titanium honeycomb panel is illustrated in FIG. 3. Referring to FIG. 3, panel 10 includes face sheets 12 made from high-temperature thermoplastic resinous materials that may optionally be reinforced with graphite or glass tape or glass fabric. Generally, titanium core 16 is a low density core having a density less than about 6 lb/ft$^3$ that has been prepared to facilitate structural adhesion to face sheets 12. The bond between face sheets 12 and titanium core 16 is established using a compatible thermoplastic resin bonding layer 14 that allows co-consolidation of titanium core 16 to face sheets 12 without degradation or damage to the individual components. Panel 10 can include core splice 18 positioned between discrete titanium honeycomb core segments to create a load carrying splice. Preferably, the core splice is made from a foaming adhesive.

The face sheet of the panel of the present invention is a thermally consolidated composite formed from a multi-ply resinous laminate and a resinous bonding layer. The face sheet can be prepared by either wet or dry thermoplastic resin systems. Preferred wet resin systems include aromatic polyimide systems commercially available from, for example, Cytec under the designations Avimid K and K-3B systems. Avimid K has a glass transition temperature slightly higher than K-3B. Preferred dry resinous systems include polyetherimide commercially available from, for example, General Electric, under the designation Ultem and polyether ether ketone (PEEK) commercially available from, for example, Quadrex. Generally, the face sheet is laminate composite made from one or more thermoplastic resinous materials. The face sheets' thermoplastic resinous material is preferably stable at elevated temperature between, for example, about 350°–400° F. The thermoplastic resinous face sheet can be a reinforced face sheet such as a sheet including a reinforcement material such as graphite tape, for example, K-3B/IM7 graphite tape (Hercules Inc.), or glass fabric such as Ultem/S-2 glass fabric. The face sheet has an outward facing heat-stable surface and an inward facing bonding surface. As used herein, the terms "outward" and "inward" refer to face sheet surfaces relative to the panel's central core. the face sheet's outward facing surface is formed by laminating thermoplastic resinous materials having a relatively high glass transition temperature. The glass transition temperature ($T_g$) for a thermoplastic is the temperature at which the resin begins to soften. Suitable thermoplastic materials for forming the face sheet's outward facing surface have a glass transition temperature from about 450° F. to about 550° F., and preferably from about 450° F. to 500° F. The face sheet's bonding surface is formed by consolidating a thermoplastic resinous bonding layer to the face sheet's laminated relatively high glass transition temperature components. Suitable thermoplastic resinous materials for forming the face sheet's bonding surface have a glass transition temperature lower than the glass transition temperature of the face sheet's other thermoplastic components, preferably a glass transition temperature from about 375° F. to about 425° F.

To promote bonding of the face sheets to the titanium honeycomb core in the co-consolidation step, a thermoplastic resinous bonding layer having a lower glass transition temperature than the thermoplastic composite face sheet is interposed between the face sheet and the titanium core as a bonding layer. The lower glass transition temperature of the intermediate thermoplastic resinous bonding layer assures that co-consolidation cycles can be used that promote bonding between the face sheet and the titanium core while, at the same time, utilizing temperatures sufficiently low as to avoid face sheet delamination. For aromatic polyimide, e.g., Avimid K and K-3B, face sheets, an aromatic polyimide thermoplastic resinous material commercially available from, for example, Cytec under the designation Avimid K-3A film is preferred. For polyetherimide, e.g., Ultem, face sheets, a polyetherimide thermoplastic resinous material commercially available from General Electric, under the designation Daynar 1005 is preferred.

The thermoplastic titanium honeycomb panel of the present invention derives its stiffness from the titanium honeycomb core substructure. The titanium honeycomb core useful in the panel of the present invention is made of a thin foil having a thickness from about 0.002 to about 0.0025 inch, a cell size from about ¼ to about ⅜ inch, and has a density from about 2.7 to about 6.0 lb/ft$^3$. Other suitable honeycomb cores include, for example, small cell size, high density titanium cores and polyimide/graphite cores. For multicore panels, the panel includes core splice 18 preferably made from a foaming adhesive. Suitable foaming adhesives include bismaleimide adhesives commercially available from, for example, Ciba-Geigy Plastics under the designation DLS 1188.

Previous attempts at fabricating thermoplastic titanium panels using such low density titanium cores by traditional processing methods including, for example, high temperature co-consolidation and adhesive bonding methods, have proven unsuccessful because of the inability to create high temperature structural panels having good bonding between the face sheets and the core without degrading the face sheet.

Thus, in another aspect, the present invention provides a method for fabricating a thermoplastic titanium honeycomb panel. Generally, the method is a thermal consolidation method that includes forming the thermoplastic face sheets, preparing the titanium honeycomb core for bonding, and fabricating the honeycomb panel by co-consolidation of the thermoplastic face sheets to the titanium core.

Thermoplastic face sheet fabrication generally includes thermoplastic face sheet and bonding layer layup to form a laminate/bonding layer composite assembly, bagging the assembly for consolidation, consolidating the assembly to form the face sheet, and then preparing the face sheet bonding surface for bonding to the titanium core.

The face sheet is a laminate composite having a sufficient thickness (e.g., from about 0.02 to about 0.08 inch thick) and design adequate for carrying the high load requirements of primary structural panels. The face sheet generally consists of individual tape or fabric plies formed into a laminate. Preferably, the laminate is a multi-ply laminate including preimpregnated resinous plies and graphite.

Figure 4:
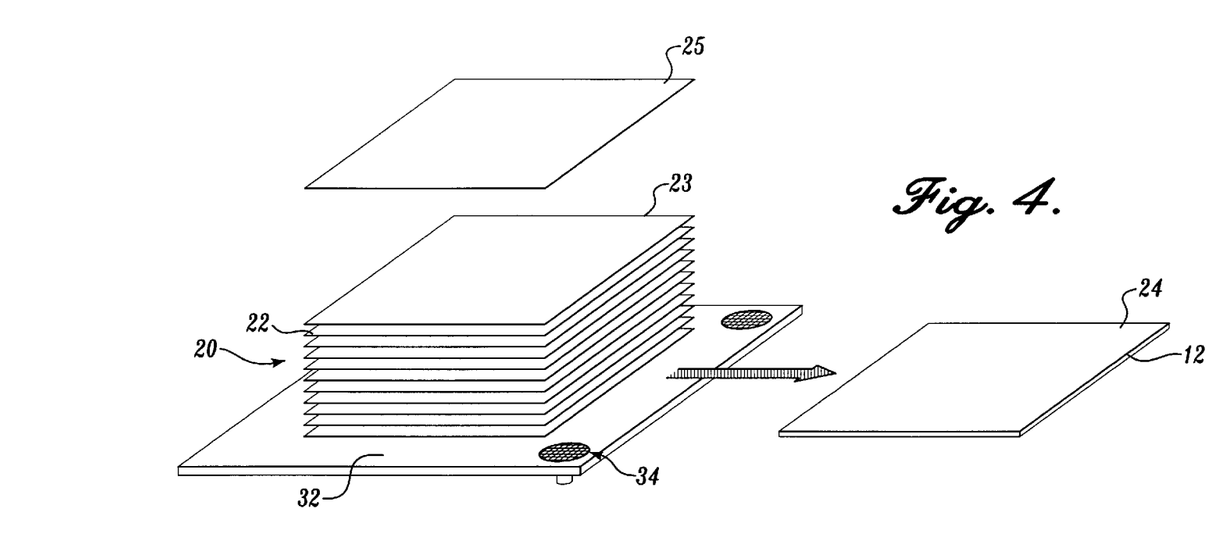
FIG. 4 is a perspective view of laminate ply stack for forming a face sheet having a bonding surface.

A representative laminate ply stack for forming a face sheet 12 having a bonding surface 24 is shown in FIG. 4. Referring to FIG. 4, laminate plies 22 (e.g., ten plies shown in the FIGURE) are stacked onto high-temperature tool surface 32 of the laminating bag. The ply stack is created by laying up individual tape or fabric composite plies, for example, a resin impregnated graphite tape (e.g., K-3B/ IM7). In a preferred embodiment, the individual plies are oriented with regard to grain (e.g., as shown in the FIGURE, orientation for ten plies from top to bottom: 0°, 45°, 90°, –45°, 0°, 0°, –45°, 90°, 45° 0°). As shown in FIG. 4, one surface of the layup (i.e., the bonding surface) receives a ply of a thermoplastic resin bonding layer 23 that facilitates face sheet bonding to the titanium core in the method's later co-consolidation step. As noted above, thermoplastic resinous bonding layer 23 is preferably an aromatic polyimide (e.g., K-3A) film when the face sheet is formed from an aromatic polyimide resin (e.g., Avimid K and K-3B) and a polyetherimide (e.g., Daynar 1005) film when the face sheet is formed from a polyetherimide resin (e.g., Ultem). Thermoplastic resinous bonding layer 23 is applied to the laminate stack and incorporated into the face sheet at this stage to ensure full adhesion between the laminate plies of the face sheet and bonding layer 24 is achieved through the high temperature, high pressure consolidation cycle (e.g., 665° F. and 185 psi). Such a high temperature, high pressure preconsolidation eliminates the need to create the bond between the face sheet and thermoplastic resinous bonding layer during the subsequent reduced temperature, reduced pressure co-consolidation cycle (e.g., 525° F. and 35 psi). The component thermoplastic materials of bonding layer 23 generally have a glass transition temperature lower than the component thermoplastic materials of laminate plies 22 and comparable to the glass transition temperature of the component thermoplastic materials of the panel's intermediate bonding layer 14. Thermoplastic resinous bonding layer 23 has a thickness between from about 5 to about 10 mils and can be either unsupported or supported with a glass carrier. A supported carrier provides the added benefit of reducing cracks in the resin that may arise during severe temperature cycling over the life of the thermoplastic titanium honeycomb panel. Bonding layer 23 can be placed either on top or beneath the ply stack, depending on whether the layup is an upper or lower face sheet and whether the bonding surface is the bag or tool side of the ply stack. When bonding layer 23 is on the bag side of the ply stack, perforated release film 25, a high-temperature perforated release film, preferably made of a perforated thermalimid bagging available from, for example, International Products, Inc. under the designation Kapton, is placed above layer 23 and is used to create a barrier that will pass volatile vapors and impede resin flow during the consolidation cycle. Tool surface 32 is preferably a highly conductive thin sheet made from, for example, an iron nickel alloy available from CTE Tooling under the designation Invar 42 and having a thickness of ¼ inch and that is conducive to rapid and consistent heating over large planform areas. In addition, the tool surface is preferably made from a material having a low coefficient of thermal expansion (CTE) that closely matches that of the laminate throughout the high temperature consolidation cycle. Tool surface 32 includes vacuum ports 34 built into the tool to facilitate volatile removal during the consolidation cycle.

Figure 5:
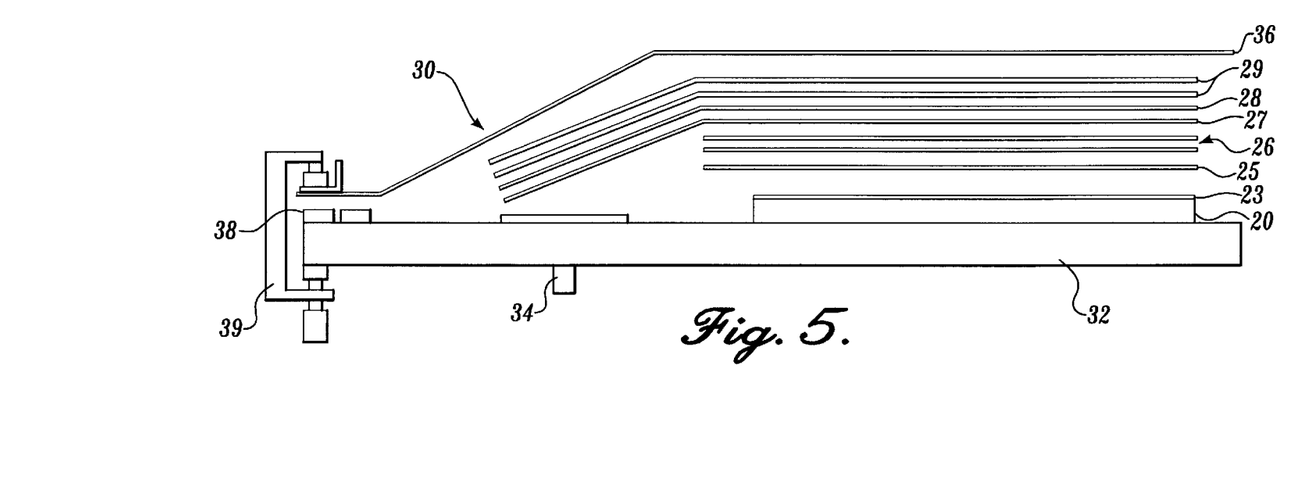
FIG. 5 is a cross-sectional view of a representative high temperature bagging system suitable for consolidating a laminate ply stack to form a face sheet having a bonding surface.

The face sheet ply stack is laminated through a high temperature consolidation cycle carried out in a laminate bag. FIG. 5 illustrates a representative high temperature bagging system 30 suitable for consolidating a thermoplastic ply stack 20 to a bonding layer 23. The bagging system is preferred for forming the laminated face sheet of the present invention where the thermoplastic materials undergo condensate reaction to achieve true melt fusible thermoplastic properties. During the reaction, while being heated to 655° F. and pressurized to 185 psi, the thermoplastic materials release N-methyl-2-pyrrolidone (NMP), water, and ethanol. Traditionally, extraction of these volatiles from a thick panel often limits autoclave heat-up rate and requires extended hold times to allow time sufficient for transport of these vapors through the ply stack into breather blankets and out through the tool vacuum ports. The relatively thin face sheet ply stacks used in forming the face sheets of the present invention permit rapid removal of the formed vapors without imposing limitations on autoclave heat up.

Referring to FIG. 5, ply stack 20 with associated bonding layer 23 is laid on tool surface 32 as described above (and illustrated in FIG. 4) and covered with perforated release film 25. The stack is then preferably covered with two layers of high temperature breathable release film 26, for example, a porous film (e.g., an Armalon film available from Airtech International under the designation Release Ease), and breather blankets 27, 28, and 29 to facilitate removal of volatiles during the consolidation of wet thermoplastic materials (e.g., Avimid K and K-3B) and to ensure trapped air removal during consolidation of dry thermoplastic materials (Ultem and PEEK). The breather blankets preferably include one finely woven layer (e.g., 120 fiberglass), breather blanket 27; one medium woven layer (e.g., 181 fiberglass), breather blanket 28; and two coarse layers (e.g., 7500 fiberglass), breather blankets 29. The fine fiberglass layer imparts a textured surface impression to the consolidated face sheets that is preferred for enhanced bonding of the face sheet to the titanium core (where bonding layer 23 is bag side) or, conversely, a surface consistency that has been shown to resist dimpling during the co-consolidation step (where the bonding layer 23 is tool side). Medium breather blanket 28 acts as a buffer layer between the thick high volume breather layers and the thin surfacing breather layer. The breather blankets are covered with high temperature bagging film 36, made from, for example, Kapton, sealed to the tool surface with sealant 38 (e.g., A800 G3 High Temperature Vacuum Bag Sealant Tape available from Airtech International) and held in position with clamp 39 during consolidation. Vacuum ports 34 remove entrapped air and reaction by-products during the vacuum consolidation process.

Preconsolidation of the face sheet of the thermoplastic titanium honeycomb panel is required because the face sheets' thermoplastic resinous materials require extremely high temperature and high pressure to fully compact and effectively thermally consolidate. These relatively severe processing conditions preclude co-consolidation of thermoplastic face sheets directly to a titanium core in a one-step operation. Furthermore, because of their associated condensate reactions, preferred thermoplastic face sheet materials Avimid K and K-3B must be heated rather slowly at rates between 0.5° and 1° F. per minute (depending on lamninate thickness) to a temperature of 655° F. and a pressure of 185 psi. Dry thermoplastics, such as Ultem and PEEK, can be heated as rapidly as the autoclave will allow, typically from 3° to 5° F. per minute, to the required 675° F. temperature and 125 psi pressure. During consolidation of the thermoplastic ply stack 20 and bonding layer 23 to provide face sheet 12 having bonding surface 24, cycle time is preferably minimized to avoid degrading or crosslinking the lower glass transition temperature bonding resin of layer 23. For example, a 0.5° F. per minute heat-up rate for K-3B processing for consolidating K-3A film to a K-3B ply stack, the K-3A viscosity will increase to a point where its bonding performance during the subsequent low temperature co-consolidation cycle is adversely affected. As a result, for such a heat up, effective fusion and strength will not be achieved between bonding surface 24 of face sheet 12 and titanium core 16. Along with heat-up rate, any high temperature holds, for example, from one to four hours for Avimid K and K-3B, are preferably minimized to avoid resin film aging. Generally, face sheets 12 are relatively thin and do not require long process cycles to effect consolidation. Furthermore, the use of a thin Invar 42 material for tool surface 32 ensures that the process cycle need not be constrained by tool mass and zones of differential heat transfer.

Figure 6:
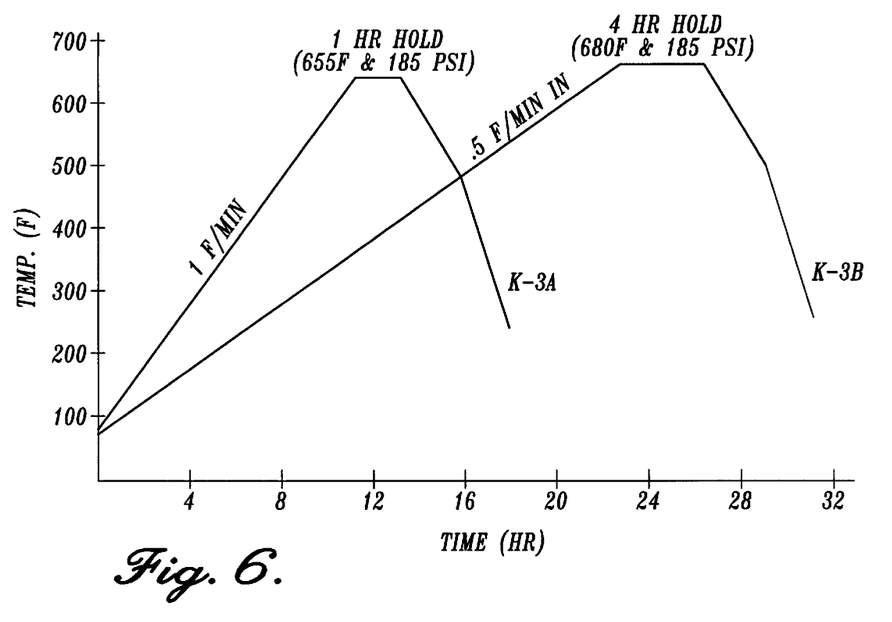
FIG. 6 is a graph illustrating a representative face sheet consolidation cycle.

Representative face sheet consolidation process cycles for face sheets formed from K-3A and K-3B are illustrated in FIG. 6. Referring to FIG. 6, the short cycle having a one-hour hold at 655° F. and 185 psi is preferably used to consolidate K-3A resin film (i.e., thermoplastic resin bonding layer 23) to K-3B ply stacks. As noted above, the rapid heating cycle minimizes resin film degradation.

Prior to adhering the face sheet to the titanium core, the face sheet bonding surface 24 is prepared. Autoclaving the ply stack and bonding layer together in a high temperature/pressure cycle ensures that the two layers are fully compacted and fused into a single resin-rich laminate face sheet. Typically during this consolidation cycle, resin bonding surface 24 becomes contaminated with a release agent residue. Generally, a release agent is applied to tool surface 32 and perforated release film 25 during bagging to ensure that the ply stack does not adhere to the tool or bagging materials. Any release agent residue remaining of the face sheet bonding surface will impede face sheet bonding to the titanium core during the co-consolidation step. Bonding test results indicate that bead blasting and methyl ethyl ketone (MEK) wiping of the face sheet's bonding surface is the most effective way to remove any residual release agent and to prepare the face sheet for co-consolidation. In addition to removing all release agent residue, bead abrading simultaneously creates a textured surface that further facilitates the bonding of the face sheet to the titanium core.

To achieve an effective bond between face sheets 12 and titanium honeycomb core 16, the titanium core is preferably also prepared for bonding. The titanium core is preferably etched such that an applied resinous bonding film will have a chemically active surface to which to adhere. The etched core is also preferably primed such that core etching does not degrade prior to consolidation. Preferably, the resinous bonding film applied to and infused into the core creates a series of resin fillets that are established at the top and bottom of each honeycomb cell. The resin-treated core is then baked such that effective adherence of the fillets to the core is established prior to co-consolidating the face sheets to the core. Thus, the titanium core is prepared for face sheet co-consolidation by etching the core; priming the core; if necessary, forming the core; infusing bonding resin into the core; and baking the core to adhere resin to the core.

The titanium honeycomb core is etched and anodized to clean and chemically activate the titanium surface prior to bonding. Preferably, the titanium core is anodized with chromic acid by a manner well known to those in the industry.

Preferably, the etched core is co-consolidated with the thermoplastic face sheets within 72 hours of anodizing. If the core is not used within 72 hours, the chemically active groups on the core's surface disappear and the core becomes contaminated. To avoid such degradation, the anodized core's surface is preferably primed with a low viscosity spray or brush-on liquid that effectively wets the surface and preserves its integrity until an adhesive film (i.e., resinous bonding film) can be applied. A suitable sprayable primer can be made by diluting K-3A in 15% by weight NMP. The primer can be sprayed onto the tops and bottoms of the core's cell walls and baked at 450° F. for four hours.

Because most parts fabricated from the thermoplastic titanium honeycomb panels of the present invention are not flat, a forming step is usually required prior to co-consolidation of the titanium core with the face sheets. The forming step is carried out on the primed titanium core by forming techniques including, for example, hot forming in a heated press. Suitable forming techniques are known in the art and are generally suitable for forming the titanium cores useful in the thermoplastic titanium honeycomb of the present invention.

Figure 7A:
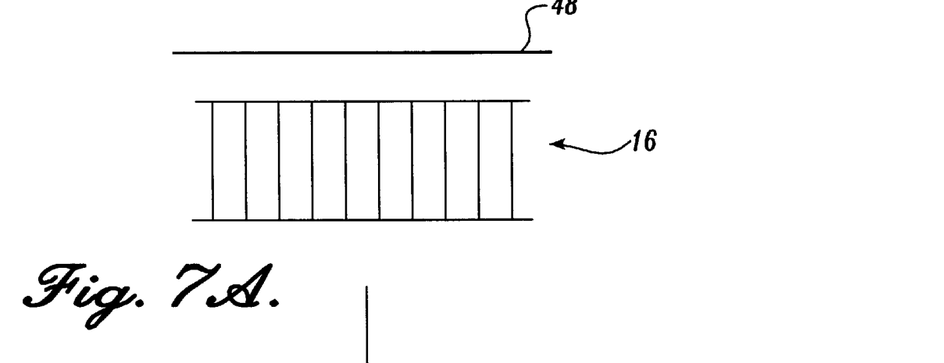
FIG. 7A is a side view of a honeycomb core and a bonding film.
Figure 7B:
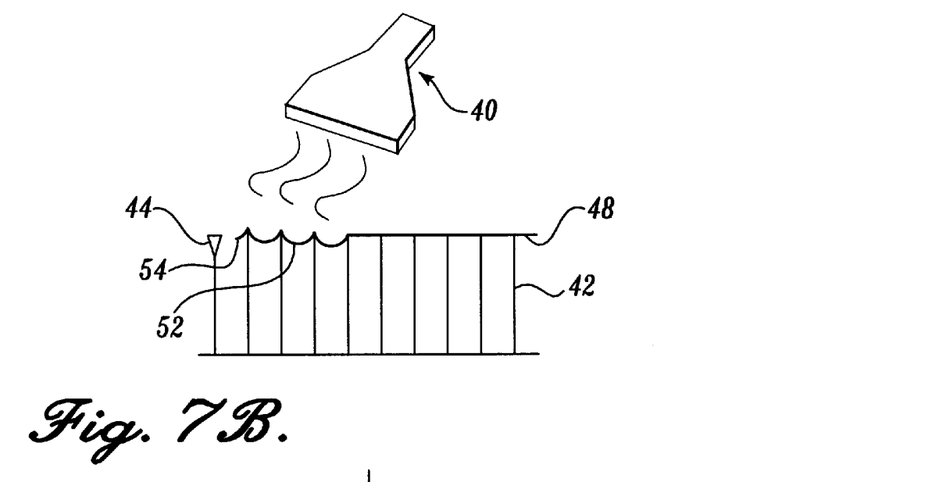
FIG. 7B is a side view of the formation of resin fillets in a honeycomb core.
Figure 7C:
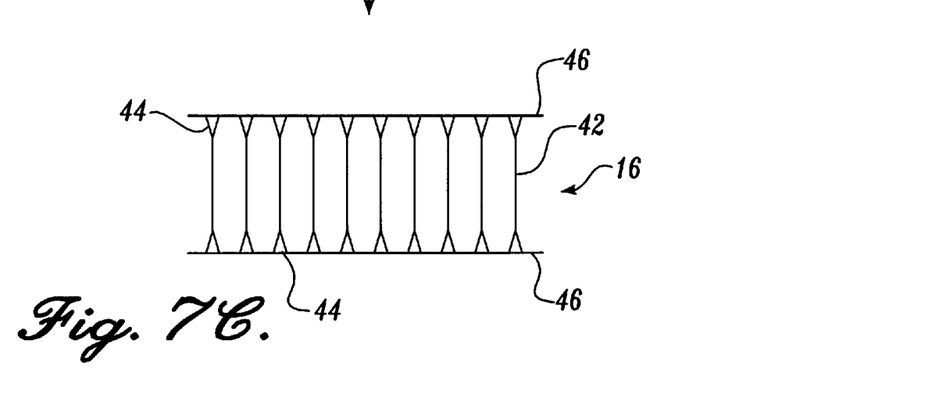
FIG. 7C is a side view of resin filleted honeycomb core.

As with the initial high temperature/high pressure autoclave cycle that bonds the thermoplastic laminate plies to the bonding layer to provide the face sheet having a bonding surface, an effective bond between the titanium core and a bonding film is also preferably formed prior to co-consolidation. Because the titanium cell walls are extremely thin and have only a minimal area to establish a core to face sheet bond, a resin fillet is preferably formed on the core that effectively extends and increases the core's bonding surface. Resin fillets on a representative titanium core are shown in FIG. 7. Referring to FIG. 7C, titanium honeycomb core 16 includes cell walls 42, resin fillets 44 and bonding surfaces 46. As noted above, thermoplastic resin films tend to age during temperature cycling and, if subjected to elevated temperatures for extended periods of time, their performance as adherents can be degraded.

Resin fillets can be created using high-temperature oven autoclave cycles (e.g., 600°–650° F.) to melt thermoplastic resin in various combinations of vacuum and pressure to form the resinous film into fillets. However, tensile testing shows that the strength values for oven or autoclave resin infused cores are typically 20%–40% lower than those obtained by the preferred method described below. The degradation observed in the structural value can be attributed to the limited heat-up rate capability (e.g., 3°–5° F./minute) of autoclaves and ovens that, when extended up to elevated thermoplastic melt temperatures, resulting in aging effects on the bonding film.

Resin infusion into the core is preferably achieved and resin fillets are formed by heating a resinous bonding film to above melt temperature (e.g., 600°–650° F.). Generally, like the face sheet's bonding surface and the panel's intermediate bonding layer, the component thermoplastic materials of the core's bonding film have a melt temperature of about 600° F. and a glass transition temperature of about 425° F. In a preferred embodiment, the bonding film is an aromatic polyimide film (e.g., K-3A). Referring to FIGS. 7A and 7B, bonding film 48 can be melted nearly instantaneously with air nozzle 40 having air with velocity and temperature sufficient to effect nearly instantaneous melting of the bonding film. As the bonding film reaches melt, the hot air expelled by the nozzle pushes the viscous film into a bubble 52, which, upon further heating, bursts creating individuals resin strands 52 that cling to adjacent titanium core walls 42 and provide the desired resin fillet 44. Forming resin fillets by this method increases the bonding surface of the core by creating a large area teardrop bonding surface 46 without degrading the bonding film resin.

Although the heated air nozzle pushes the resin film into the desired fillet shape, the process does not heat the core sufficiently to create a structural bond between the fillet and the core. Thus, a secondary rapid high temperature soak is required. The soak can be accomplished by placing the fillet core assembly in a preheated oven or press at about 650° F. Because of the viscous nature of the thermoplastic bonding resin, even at melt temperatures, the fillets maintain their shape during heat up and do not flow away from the core. Typically, a 15-minute soak is sufficient for the resin fillets to become structurally adhered to the chemically activated (i.e., etched, anodized, and primed) surface of the titanium core.

The honeycomb panel is fabricated by co-consolidation of the prepared titanium core and the preconsolidated face sheets. The honeycomb panel is formed by a co-consolidation bagging method that includes the steps of preparing a panel assembly; placing the lower face sheet (bonding surface up) on the tool surface; placing a virgin resinous bonding layer on top of the lower preconsolidated face sheet; placing the prepared core and, if required, foaming adhesive to join more than one core together in the panel, on the virgin resinous bonding layer; adding a second virgin resinous bonding layer on top of the prepared core; and completing the panel assembly by placing a second, upper face sheet (bonding surface down) on the virgin bonding resin. The honeycomb panel assembly consisting of resin-rich face sheets, filleted honeycomb core and virgin resin bonding layers is then covered with a bag assembly for co-consolidation.

Figure 8:
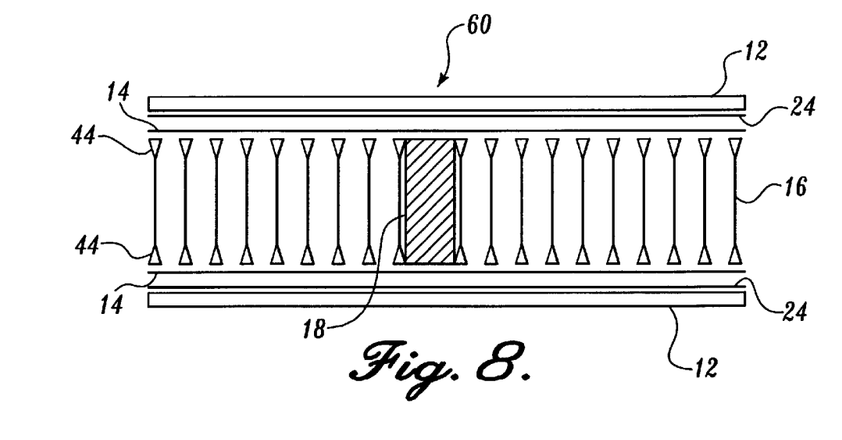
FIG. 8 is a cross-sectional view of a representative honeycomb panel assembly formed in accordance with the present invention.

A representative honeycomb panel assembly is illustrated in FIG. 8. Referring to FIG. 8, assembly 60 includes face sheets 12 having bonding surfaces 24, virgin resinous bonding layers 14, titanium honeycomb core 16 having resin fillets 44, and core splice 18. A representative co-consolidated bagging device is shown in FIG. 9.

Generally, the tool surface is prepared for co-consolidation bagging by cleaning the tool and then applying a release agent (e.g., Frekote 710) in a manner consistent with high temperature bagging procedures noted above. In addition to the use of a release agent, in a preferred embodiment, the method for co-consolidating the thermoplastic face sheets to the titanium honeycomb core includes the application of a layer of a textured release film to the tool surface. The release film is preferably a 15 mil nonporous Armalon film. Because the co-consolidation cycle takes the preconsolidated face sheet to a temperature (i.e., 525° F.) slightly above the thermoplastic's glass transition temperature (i.e., 425°–475° F.), the face sheet takes on impressions from the tool surface during the co-consolidation cycle. Surfacing process trials have shown that face sheets co-consolidated directly against a smooth metal surface, such as a polished ¼ inch Invar tool surface, tend to be susceptible to dimpling between the core cells. Face sheets co-consolidated against a slightly textured surface, such as a porous textured release film, merely take on this textured appearance and do not dimple.

Figure 9:
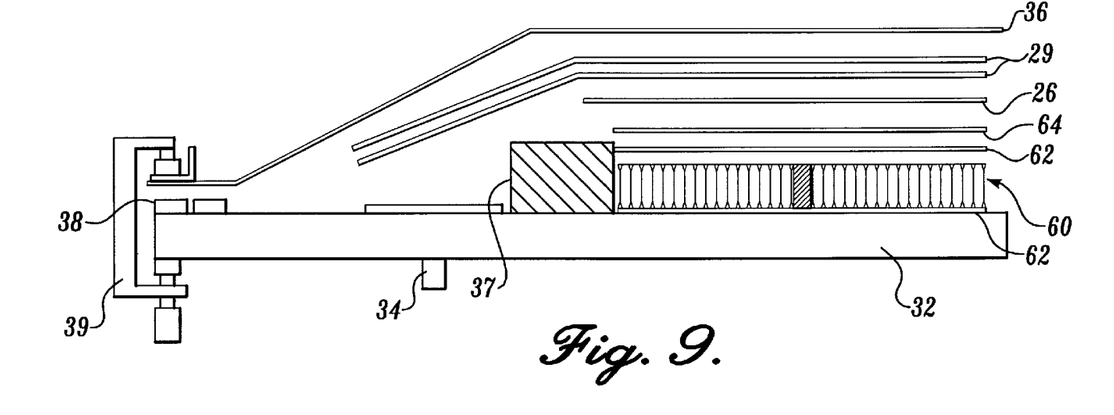
FIG. 9 is a cross-sectional view of a representative bagging device for fabricating a honeycomb panel formed in accordance with the present invention.

Referring to FIG. 9, lower face sheet 12 (bonding surface up) is placed on top of nonporous release film layer 62. Because the face sheet is preconsolidated, the face sheet is boardy and is contoured to match the shape of the tool surface. Bonding surface 24 of the face sheet is then cleaned by wiping with MEK to insure that no contaminants are present that could adversely affect the bond between the face sheet and the core.

A virgin thermoplastic resin bonding layer 14 is then placed on bonding surface 24 of face sheet 12. Structural tests have shown that the application of a layer of thin virgin thermoplastic resin bonding layer between the face sheets and the core prior to co-consolidation enhances, by as much as 15%, the bond strength between the face sheet bonding surface, which has been through a preconsolidation cycle, and the core infused fillets, which have been hot air infused and baked on in an oven soak. The increase in flatwise tensile strength is a combination of the resin aging effect and the virgin resin acting as a gap filler between the preconsolidated face sheets and the formed titanium core.

The prepared titanium core is then placed on the bonding layer. Often, because of manufacturing size limitations, the titanium core must be placed in the panel assembly as multiple pieces. The core pieces are typically bonded together either during the co-consolidated process or during a previous oven cycle under vacuum pressure using a foaming adhesive. In contrast to the high temperature/high pressure co-consolidation methods during which no foaming adhesives can sustain the elevated temperature cycle (i.e., 675° F.) without severe degradation, the co-consolidation cycle of the present invention reaches an upper temperature of only above 525° F. for a period of 15–30 minutes. Under these relatively mild conditions, normal epoxy or bismaleimide (BMI) foaming adhesives can be utilized.

A second virgin thermoplastic resin bonding layer 14 is then placed on the prepared core, and the upper face sheet 12 (bonding surface down) is placed on the bonding layer. The upper face sheet's bonding surface 24 is wiped with MEK to remove any residual contaminants, as described above for the lower face sheet.

Referring again to FIG. 9, honeycomb panel assembly 60 consisting of face sheets 12 having resinous bonding surfaces 24, virgin resin bonding layers 14, and filleted titanium honeycomb core 16 is placed on nonporous release film 62 resting on tool surface 32. A second layer of nonporous release film 62 is placed on top of panel assembly 60. As noted above, the release layers create the desired surface texture and serve to minimize face sheet dimpling during the co-consolidation operation. The upper release film layer is then covered with an aluminum caul sheet 64 having a thickness (e.g., ¹⁄₁₆ inch) sufficient to prevent dimpling during heat-up, yet thin enough to take tool contour during bagging. On aluminum caul sheet 64 is placed a layer of porous release film 26 and two breather blankets 29 (e.g., 7500 fiberglass), which are added to allow for either volatile residue and/or entrapped air removal. Panel assembly 60 is preferably surrounded by edge bars 37 to avoid edge crowning. Breather blankets 29 are then covered with high-temperature bagging film 36 and sealed with sealant 38 and clamps 39. Vacuum ports 34 remove volatiles and entrapped air during the consolidation process.

Because the composite face sheet 12 is preconsolidated with bonding layer 24 and the titanium core is filleted with a bonding film having a comparable relatively low glass transition temperature, the final co-consolidation cycle to create the final panel must only reach a temperature sufficient to bond face sheet bonding surface 24 to virgin bonding layers 14 to core resinous fillets 44. The bonding layers also have a relatively low glass transition temperature comparable to the bonding surface and resinous fillets. The co-consolidation process requires a thermal cycle utilizing temperatures and pressures sufficiently low to avoid face sheet delamination (i.e., temperatures below melt temperature of about 600° F.) and yet sufficiently high to establish resin-to-resin bonding (i.e., above the resin's glass transition temperature of about 435° F.).

Figure 10:
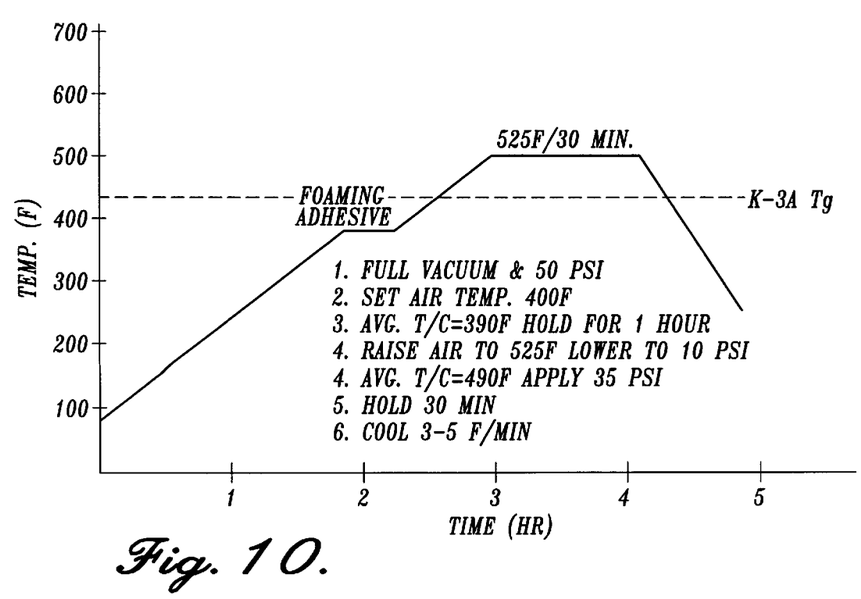
FIG. 10 is graph illustrating a representative co-consolidation cycle for fabricating a honeycomb panel formed in accordance with the present invention.

A representative optimized co-consolidation cycle is illustrated in FIG. 10. As shown in FIG. 10, the optimized process utilizes a low temperature hold, typically about 350° F., which tends to soak the assembly 60 and bring all members to a constant temperature and, for panels that include core splices, also allows the foaming adhesive to expand. A relatively high pressure, typically 50 psi and full vacuum, is maintained during this soak/foaming period to insure that the foaming adhesive does not expand further than desired and interfere with subsequent resin-to-resin bonding. Following the soak, a rapid heat-up step under low pressure, typically 10 psi, is used that takes the assembly to a temperature (i.e., about 525° F.) sufficient to create the resin-to-resin bond, yet low enough to avoid face sheet delamination or dimpling. Once the assembly reaches the desired hold temperature, the pressure is increased (i.e., about 35 psi) sufficient to effect bonding, yet low enough to avoid dimpling or ply cutting. At temperature, the assembly is held for a period of time, typically 15–30 minutes, sufficient to effect the resin-to-resin bond. The assembly is then cooled at a rate (e.g., 3°–5° F./min.) that is sufficiently rapid to keep the assembly from seeing elevated temperatures any longer than required to bond, yet slow enough to avoid inducing internal stresses.

The heat-up rates, hold temperature, hold time, and cool down rate shown in FIG. 10 are representative and optimized for bonding K-3B face sheets to a titanium core using K-3B bonding layers. Similar cycles can be employed for Avimid K, Ultem, and PEEK resin systems.

The method of the present invention for fabricating thermoplastic titanium low density honeycomb panels has been validated through nondestructive inspection, photomicrographing and destructive flatwise tensile testing. Acceptable tensile values of up to 650 lb/in$^2$ for K-3B face sheets co-consolidated to ¼ inch 4.7 lb/ft$^3$ titanium core have been obtained.

The method of the present invention provides thermoplastic titanium honeycomb panels previously unattainable. Previous high temperature thermoplastic face sheet to titanium honeycomb co-consolidation efforts were unsuccessful because of face sheet dimpling, core crushing, and face sheet ply cutting. Although flanged titanium cores overcome these problems, the solution is disadvantageous because of increased weight considerations. The co-consolidation process of the present invention can be used to produce both flanged and unflanged core panels. The co-consolidation process of the present invention can be used for extremely low density (e.g., down to 2.7 lb/ft$^3$), large cell size (e.g., up to ⅜ inch) titanium cores without dimpling the face sheets or crushing the core. The method also is adaptable to both wet (e.g., Avimid K and K-3B) and dry (e.g., Ultem and PEEK) thermoplastic composite face sheet materials.

In contrast to processes that involve the co-curing of face sheets to the core using a 350° F. thermoset adhesive, the use of a thermoplastic resin film as the bonding layer in the method of the present invention does not limit final part use temperatures. The use of a thermoplastic resin film as a bonding layer having a slightly lower glass transition temperature than the composite face sheets insures that a co-consolidation process cycle will fuse the resin without delaminating the face sheets. The face sheet laminate-to-resin film bond is established using a novel short duration full temperature full pressure consolidation autoclave cycle that minimizes resin film aging effects.

The tool used in the method of the present invention includes a thin tool surface having a low coefficient of thermal expansion that allows short autoclave cycles and insures consistent heat transfer over the entire core assembly planform area. During the co-consolidation process, a laminate surfacing film is used to minimize face sheet dimpling. In the method, breather blanket stacks for initial consolidation and low temperature co-consolidation are optimized for volatile removal and surface appearance. The method of the present invention provides a preferred surface preparation and texturing method for preconsolidated face sheets prior to optimizing the bond obtained during low temperature co-consolidation.

To optimize core-to-face sheet bond strength, the titanium honeycomb core surface is prepared and primed in the method. The method also includes a novel resin infusion and bake-to-core method that minimizes resin aging and creates a resin fillet that increases the core's effective bonding surface area.

In the methods of the present invention, the same tool that is used to preconsolidate the face sheet can also be used for co-consolidating the face sheets to the titanium core. In the co-consolidation process, a thin virgin layer of thermoplastic resin is use to optimize the bond strength between the face sheet and the core. The low temperature/low pressure co-consolidation process of the present invention is amenable to standard epoxy and BMI foaming adhesive for use at honeycomb core joints.

To summarize, the co-consolidation cycle of the present invention creates an optimal strength bond while minimizing dimpling, core crushing and face sheet ply cutting. The combination of processing steps, tooling materials, and bagging techniques combine to allow the creation of high temperature thermoplastic titanium honeycomb core panels having advantageous properties and useful structural panels in environments where strength-to-weight and elevated use temperature considerations are important.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A structural panel sequentially comprising:
   (a) a first face sheet having an outward facing surface and an inward facing bonding surface, wherein the outward facing surface comprises a first resinous material and the inward facing bonding surface comprises a second resinous material, wherein the melt temperature of the first resinous material is greater than the melt temperature of the second resinous material;

(b) a first bonding layer, comprising a third resinous material having a melt temperature comparable to the melt temperature of the second resinous material;

(c) a titanium honeycomb core, comprising resin fillets;

(d) a second bonding layers comprising a third resinous material having a melt temperature comparable to the melt temperature of the second resinous material; and (e) a second face sheet having an outward facing surface and an inward facing bonding surface, wherein the outward facing surface comprises a first resinous material and the inward facing bonding surface comprises a second resinous material, wherein the melt temperature of the first resinous material is greater than the melt temperature of the second resinous material.

2. The panel of claim 1 wherein each face sheet comprises a thermoplastic laminate composite.

3. The panel of claim 2 wherein the laminate composite comprises a multi-ply laminate.

4. The panel of claim 3 wherein the multi-ply laminate comprises plies of preimpregnated resin and graphite.

5. The panel of claim 2 wherein the multi-ply laminate comprises oriented plies.

6. The panel of claim 2 wherein the laminate composite comprises a wet thermoplastic resin system.

7. The panel of claim 6 wherein the wet thermoplastic system comprises an aromatic polyimide resinous material.

8. The panel of claim 2 wherein the laminate composite comprises a dry thermoplastic resin system.

9. The panel of claim 8 wherein the dry thermoplastic system comprises a resinous material selected from the group selected from a polyetherimide and a polyether ether ketone resinous material.

10. The panel of claim 3 wherein the laminate composite comprises a reinforcement material.

11. The panel of claim 10 wherein the reinforcement material is selected from the group consisting of graphite tape and glass fabric.

12. The panel of claim 1 wherein each bonding surface comprises a resinous material selected from the group consisting of an aromatic polyimide resinous material and a polyetherimide resinous material.

13. The panel of claim 1 wherein each face sheet has a thickness of from about 0.02 to about 0.08 inch.

14. The panel of claim 1 wherein each face sheet is thermally stable at temperatures between about 350° F. to about 400° F.

15. The panel of claim 2 wherein the laminate composite comprises a first thermoplastic resinous material having a melt temperature in the range of from about 600° F. to about 650° F.

16. The panel of claim 1 wherein each bonding layer comprises a resinous material selected from the group consisting of an aromatic polyimide resinous material and a polyetherimide resinous material.

17. The panel of claim 1 wherein the titanium core has a density of from about 2.7 to about 6.0 lb/ft$^3$.

18. The panel of claim 1 wherein the titanium core has a foil thickness of from about 0.002 to about 0.0025 inch.

19. The panel of claim 1 wherein the titanium core has a cell size of from about ¼ to about ⅜ inch.

20. The panel of claim 1 wherein the resin fillets comprise a resinous material selected from the group consisting of an aromatic polyimide resinous material and a polyetherimide resinous material.

21. The panel of claim 1 wherein the titanium honeycomb core is a multicore panel.

22. The panel of claim 21 wherein the multicore panel further comprises a core splice.

23. The panel of claim 22 wherein the core splice comprises a foaming adhesive.

24. A method for fabricating a structural panel having thermoplastic face sheets and a titanium honeycomb core, comprising the steps of:

(a) forming a first and second thermoplastic face sheet, wherein each face sheet comprises an outward facing surface and an inward facing bonding surface, the outward facing surface comprising a first resinous material and the inward facing bonding surface comprising a second resinous material, wherein the melt temperature of the first resinous material is greater than the melt temperature of the second resinous material;

(b) preparing a titanium honeycomb core having resin fillets for bonding to the face sheets;

(c) preparing a panel assembly sequentially comprising a first face sheet, a first thermoplastic bonding layer, a titanium honeycomb core, a second thermoplastic bonding layer, and a second face sheet, wherein each bonding layer comprises a third resinous material having a melt temperature comparable to the melt temperature of the second resinous material; and (d) thermally consolidating the panel assembly.

25. The method of claim 24 wherein forming a thermoplastic face sheet comprises thermally consolidating a laminate composite and a bonding layer, wherein the laminate composite comprises one or more plies of a first thermoplastic resinous material and the bonding layer comprises a second thermoplastic material having a melt temperature lower than the melt temperature of the first thermoplastic material.

26. The method of claim 25 wherein thermally consolidating the laminate composite and the bonding layer comprises heating to about 655° F. at a pressure of about 185 psi and holding at that temperature and pressure for about one hour.

27. The method of claim 24 wherein preparing a titanium honeycomb core for bonding to the face sheets comprises the steps of:

(a) etching the titanium core to provide a chemically active surface;

(b) optionally, priming the etched core to preserve the chemically active surface;

(c) infusing a thermoplastic resinous material into the core to form resin fillets on the chemically active surface and (d) heating the core to bond the resin fillets to the core.

28. The method of claim 24 wherein thermally consolidating the panel assembly comprises heating to about 525° F. at a pressure of about 35 psi and holding at that temperature and pressure for about 30 minutes.

29. The method of claim 24 wherein thermally consolidating the panel assembly comprises effectively bonding the face sheets to the titanium honeycomb core through a thermoplastic resinous material having a melt temperature below the consolidation temperature.

* * * * *

UNITED STATES PATENT AND TRADEMARK OFFICE
CERTIFICATE OF CORRECTION

PATENT NO. : 6,039,832
DATED : March 21, 2000
INVENTOR(S) : D.A. McCarville It is certified that error appears in the above-identified patent and that said Letters Patent is hereby corrected as shown below:

| COLUMN | LINE | ERROR |
|---|---|---|
| 13 (Claim 1, | 5 line 13) | "layers" should read --layer,-- |
| 14 (Claim 24, | 24 line 16) | "titanium" should read --titanium-- |

Signed and Sealed this

Seventeenth Day of April, 2001

Attest:

NICHOLAS P. GODICI

Attesting Officer

Acting Director of the United States Patent and Trademark Office